US006539103B1

(12) United States Patent
Panin et al.

(10) Patent No.: US 6,539,103 B1
(45) Date of Patent: Mar. 25, 2003

(54) METHOD AND APPARATUS FOR IMAGE RECONSTRUCTION USING A KNOWLEDGE SET

(75) Inventors: Vladimir Y. Panin, Salt Lake City, UT (US); Gengsheng Lawrence Zeng, Salt Lake City, UT (US); Grant T. Gullberg, Salt Lake City, UT (US)

(73) Assignee: The University of Utah, Salt Lake City, UT (US)

( * ) Notice: Subject to any disclaimer, the term of this patent is extended or adjusted under 35 U.S.C. 154(b) by 0 days.

(21) Appl. No.: 09/189,424

(22) Filed: Nov. 10, 1998

Related U.S. Application Data
(60) Provisional application No. 60/065,582, filed on Nov. 12, 1997.

(51) Int. Cl.$^7$ ............................................... G06K 9/00

(52) U.S. Cl. .................... 382/131; 128/922; 382/128; 250/363.04

(58) Field of Search ............................. 382/128, 118, 382/129, 130, 131; 250/363.03, 370.09

(56) References Cited

U.S. PATENT DOCUMENTS

| | | | | |
|---|---|---|---|---|
| 4,873,632 A | * | 10/1989 | Logan et al. | 364/413.13 |
| 4,984,159 A | * | 1/1991 | Gillberg | 364/413.16 |
| 5,210,421 A | * | 5/1993 | Gullberg et al. | 250/363 |
| 5,338,936 A | * | 8/1994 | Gullberg et al. | 250/363.4 |
| 5,559,335 A | | 9/1996 | Zeng et al. | |
| 5,710,833 A | * | 1/1998 | Moghaddam et al. | 382/228 |
| 5,719,951 A | * | 2/1998 | Shackleton et al. | 382/118 |
| 5,821,541 A | * | 10/1998 | Tumer | 250/370.09 |
| 5,917,919 A | * | 6/1999 | Rosental | 381/71 |
| 5,936,247 A | * | 8/1999 | Lange et al. | 250/363.03 |

OTHER PUBLICATIONS

G. T. Gullberg, et al., "Review of Convergent Beam Tomography in Single Photon Emission Computed Tomography," *Phys. Med. Biol.*, vol. 37, No. 3, pp. 507–534, 1992.

J. C. Gore, et al., "The Reconstruction of Objects from Incomplete Projections," *Med. Phys.*, vol. 25, No. 1, pp. 129–136, 1980.

G. L. Zeng, et al., "A Study of Reconstruction Artifacts in Cone Beam Tomography Using Filtered Backprojection and Iterative EM Algorithms," *IEEE Trans. Nucl. Sci.*, vol. 37, No. 2, pp. 759–767, 1990.

S. H. Manglos, "Truncation Artifact Suppression in Cone-Beam Radionuclide Transmission CT Using Maximum Likelihood Techniques: Evaluation with Human Subjects," *Phys. Med. Biol.*, vol. 37, No. 3, pp. 549–5562, 1992.

(List continued on next page.)

*Primary Examiner*—Bhavesh Mehta
*Assistant Examiner*—Abolfazl Tabatabai
(74) *Attorney, Agent, or Firm*—Fay, Sharpe, Fagan, Minnich & McKee, LLP

(57) ABSTRACT

A method of constructing a non-uniform attenuation map (460) of a subject for use in image reconstruction of SPECT data is provided. It includes collecting a population of a priori transmission images and storing them in an a priori image memory (400). The transmission images not of the subject. Next, a cross-correlation matrix (410) is generated from the population of transmission images. The eigenvectors (420) of the cross-correlation matrix (410) are calculated. A set of orthonormal basis vectors (430) is generated from the eigenvectors (420). A linear combination of the basis vectors (420) is constructed (440), and coefficients for the basis vectors are determined (450) such that the linear combination thereof defines the non-uniform attenuation map (460).

24 Claims, 2 Drawing Sheets

OTHER PUBLICATIONS

G. L. Zeng, et al., "New Approaches to Reconstructing Truncated Projections in Cardiac Fan Beam and Cone Beam Tomography," *J. Nucl. Med.*, vol. 31, No. 5, p. 867, 1990 (abstract).

B. M. W. Tsui, et al., "Cardiac SPECT Reconstructions with Truncated Projections in Different SPECT System Designs," *J. Nucl. Med.*, vol. 33, No. 5, p. 831, 1992 (abstract).

G. T. Gullberg, et al., "A Reconstruction Algorithm Using Singular Value Decomposition of Discrete Representation of the Exponential Radon Transform Using Natural Pixels," *IEEE Trans. Nucl. Sci.*, vol. 41, No. 6, pp. 2812–2819, 1994.

G. L. Zeng, et al., "An SVD Study of Truncated Transmission Data in SPECT,"*IEEE Trans. Nucl. Sci.*, vol. 44, No. 1, pp. 107–111, 1997.

G. L. Zeng, et al., "Reconstructions of Truncated Projections Using an Optimal Basis Expansion Derived from the Cross-Correlation of a 'Knowledge Set' of a *priori* Cross–Sections, "*IEEE Trans. Nucl. Sci.*, vol. 45, No. 4, pp. 2119–2125, 1998.

* cited by examiner

METHOD AND APPARATUS FOR IMAGE RECONSTRUCTION USING A KNOWLEDGE SET

This application claims the benefit of U.S. Provisional Application No. 60/065,582 filed Nov. 12, 1997.

BACKGROUND OF THE INVENTION

The present invention relates to the art of diagnostic nuclear imaging. It finds particular application in conjunction with gamma cameras and single photon emission computed tomography (SPECT), and will be described with particular reference thereto. However, it is to be appreciated that the present invention is also amenable to other like applications.

Diagnostic nuclear imaging, is used to study a radionuclide distribution in a subject. Typically, in SPECT, one or more radiopharmaceuticals or radioisotopes are injected into a subject. The radiopharmaceuticals are commonly injected into the subject's blood stream for imaging the circulatory system or for imaging specific organs which absorb the injected radiopharmaceuticals. One or more gamma or scintillation camera detector heads, typically including a collimator, are placed adjacent to a surface of the subject to monitor and record emitted radiation. The camera heads typically include a scintillation crystal which produces a flash or scintillation of light each time it is struck by radiation emanating from the radioactive dye in the subject. An array of photomultiplier tubes and associated circuitry produce an output signal which is indicative of the (x, y) position of each scintillation on the crystal. Often, the heads are rotated or indexed around the subject to monitor the emitted radiation from a plurality of directions to obtain a plurality of different views. The monitored radiation data from the plurality of views is reconstructed into a three dimensional (3D) image representation of the radiopharmaceutical distribution within the subject.

One of the problems with this imaging technique is that photon absorption and scatter by portions of the subject between the emitting radionuclide and the camera head distort the resultant image. One solution for compensating for photon attenuation is to assume uniform photon attenuation throughout the subject. That is, the subject is assumed to be completely homogenous in terms of radiation attenuation with no distinction made for bone, soft tissue lung, etc. This enables attenuation estimates to be made based on the surface contour of the subject. Of course, human subjects do not cause uniform radiation attenuation, especially in the chest.

In order to obtain more accurate radiation attenuation measurements, a direct measurement is made using transmission computed tomography techniques. In this technique, radiation is projected from a radiation source through the subject. The transmission radiation is received by detectors at the opposite side. The source and detectors are rotated to collect transmission data concurrently with the emission data through a multiplicity of angles. This transmission data is reconstructed into an image representation or non-uniform attenuation map using conventional tomography algorithms. The radiation attenuation properties of the subject from the transmission computed tomography image are used to correct for radiation attenuation in the emission data. See, for example, U.S. Pat. Nos. 5,210,421 and 5,559, 335, commonly assigned and incorporated herein by reference.

However, transmission computed tomography techniques suffer from their own drawbacks. One such drawback is an undesirable increase in the patient's exposure to radiation due to the transmission scan. Moreover, the transmission scan increase the costs associated with producing clinical SPECT images.

Additionally, the truncation of transmission data or transmission projections due to a relatively small detector size is a well known problem in SPECT. This problem is further exacerbated during transmission imaging of the chest by a three-detector SPECT system with fan-beam collimators. See, for example, G. T. Gullberg, et al., "Review of Convergent Beam Tomography in Single Photon Emission Computed Tomography," *Phys. Med. Biol.,* Vol. 37, No. 3, pp. 507–534, 1992. The truncation problem results in solving a rank deficient system of linear equations, which leads to reconstruction artifacts when common reconstruction algorithms are applied. See, for example: J. C. Gore, et al., "The Reconstruction of Objects from Incomplete Projections," *Med. Phys.,* Vol. 25, No. 1, pp. 129–136, 1980; G. L. Zeng, et al., "A Study of Reconstruction Artifacts in Cone Beam Tomography Using Filtered Backprojection and Iterative EM Algorithms," *IEEE Trans. Nucl. Sci.,* Vol. 37, No. 2, pp. 759–767, 1990; S. H. Manglos, "Truncation Artifact Suppression in Cone-Beam Radionuclide Transmission CT Using Maximum Likelihood Techniques: Evaluation with Human Subjects," *Phys. Med. Biol.,* Vol. 37, No. 3, pp. 549–5562, 1992; G. L. Zeng, et al., "New Approaches to Reconstructing Truncated Projections in Cardiac Fan Beam and Cone Beam Tomography," *J. Nucl. Med.,* Vol. 31, No. 5, p. 867, 1990 (abstract); and, B. M. W. Tsui, et al., "Cardiac SPECT Reconstructions with Truncated Projections in Different SPECT System Designs," *J. Nucl. Med.,* Vol. 33, No. 5, p. 831, 1992 (abstract).

The present invention contemplates a new and improved technique for SPECT imaging which overcomes the above-referenced problems and others.

SUMMARY OF THE INVENTION

In accordance with one aspect of the present invention, a method of constructing a non-uniform attenuation map of a subject for use in image reconstruction of SPECT data is provided. It includes collecting a population of a priori transmission images. The transmission images are not of the subject. A cross-correlation matrix is generated from the population of transmission images. Next, the eigenvectors of the cross-correlation matrix are calculated. A set of orthonormal basis vectors is generated from the eigenvectors. Finally, a linear combination of the basis vectors is constructed, and coefficients for the basis vectors are determined such that the linear combination thereof defines the non-uniform attenuation map.

In accordance with a more limited aspect of the present invention, a Karhunen-Loève transform is employed to calculate the eigenvectors of the cross-correlation matrix.

In accordance with a more limited aspect of the present invention, the set of orthonormal basis vectors is constructed from a predetermined number of selected eigenvectors chosen from the eigenvectors of the cross-correlation matrix. The selected eigenvectors have corresponding eigenvalues larger than eigenvalues of non-selected eigenvectors.

In accordance with a more limited aspect of the present invention, the step of determining coefficients for the basis vectors includes iteratively comparing projections of the set of orthonormal basis vectors having estimated coefficients with truncated transmission projections from the subject. Using a least-squares fit, coefficients are selected which best match the projections of the set of orthonormal basis vectors to the truncated transmission projections from the subject.

In accordance with a more limited aspect of the present invention, the step of determining coefficients for the basis vectors includes iteratively employing Natterer's data consistency conditions to relate emission data from the subject to transmission projections. The transmission projections are generated from projections of the set of orthonormal basis vectors having estimated coefficients. Using a least-squares fit, coefficients are selected which generate the transmission projections that best fulfill Natterer's data consistency conditions.

In accordance with a more limited aspect of the present invention, no transmission scan of the subject is performed.

In accordance with a more limited aspect of the present invention, the predetermined number of selected eigenvectors is less than or equal to approximately 15% of all the eigenvectors.

In accordance with another aspect of the present invention, an image processor for reconstructing images of a distribution of radioactive material in a patient being examined with a gamma camera is provided. It includes an emission memory which stores emission data collected by the gamma camera. An attenuation factor memory stores attenuation factors calculated from a non-uniform attenuation map. A data processor takes the emission data and corrects it for attenuation in accordance with the attenuation factors stored in the attenuation factor memory. A reconstruction processor takes corrected emission data from the data processor and therefrom reconstructs an image representation of the distribution of radioactive material in the patient. An a priori image memory stores a priori transmission data from a plurality of a priori transmission scans of a region of interest that is the same as that being reconstructed. The transmission scans originate from subjects other than the patient. A cross-correlation data processor constructs a cross-correlation matrix from the a priori transmission scans, and an eigenvector data processor calculates eigenvectors of the cross-correlation matrix. A basis data processor constructs a set of orthonormal basis vectors from the eigenvectors of the cross-correlation matrix, and an iterative data processor computes coefficients for the basis vectors such that a linear combination thereof defines the non-uniform attenuation map.

One advantage of the present invention is that accurate non-uniform attenuation maps are achieved.

Another advantage of the present invention is the patients' radiation dosage is lessened by the elimination of transmission scans.

Yet another advantage of the present invention is that accurate non-uniform attenuation maps are achieved from truncated transmission scans.

Still further advantages and benefits of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

Figure 1:
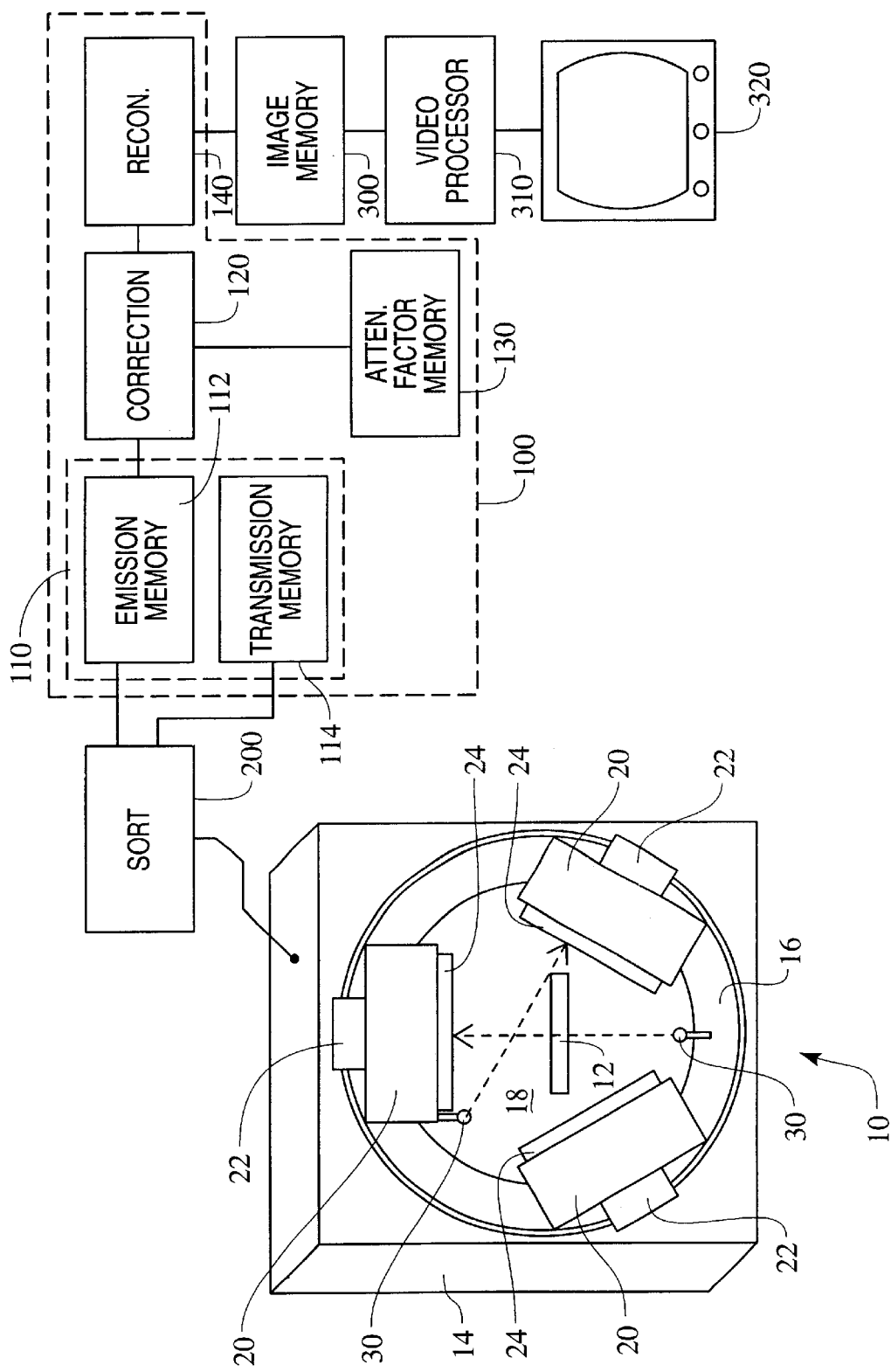
FIG. 1 is a diagrammatic illustration of a nuclear medicine gamma camera in accordance with aspects of the present invention; and, FIG. 2 is a diagrammatic illustration showing a technique for the construction of a non-uniform attenuation map in accordance with aspects of the present invention.

With reference to FIG. 1, a diagnostic nuclear imaging apparatus or gamma camera 10 includes a subject support 12, such as a table or couch, which supports a subject being examined and/or imaged such as a phantom or patient. The subject is injected with one or more radiopharmaceuticals or radioisotopes such that emission radiation is emitted therefrom. Optionally, the subject support 12 is selectively height adjustable so as to center the subject at a desired height. A first gantry 14 holds a rotating gantry 16 rotatably mounted thereto. The rotating gantry 16 defines a subject-receiving aperture 18. In a preferred embodiment, the first gantry 14 is advanced toward and/or retracted from the subject support 12 so as to selectively position regions of interest of the subject within the subject-receiving aperture 18. Alternately, the subject support 12 is advanced and/or retracted to achieve the desired positioning of the subject within the subject- receiving aperture 18.

One or more detector heads 20 are adjustably mounted to the rotating gantry 16 with varying degrees of freedom of movement. Optionally, the detector heads 20 are circumferentially adjustable to vary their spacing on the rotating gantry 16. Separate translation devices 22, such as motors and drive assemblies (not shown), independently translate the detector heads 20 laterally in directions tangential to the subject-receiving aperture 18 along linear tracks or other appropriate guides. Additionally, the detector heads 20 are also independently movable in radial directions with respect to the subject-receiving aperture 18. Optionally, the detector heads 20 selectively cant or tilt with respect to radial lines from the center of the subject-receiving aperture 18. Alternately, a single motor and drive assembly controls movement of all the detector heads 20 individually and/or as a unit.

Being mounted to the rotating gantry 16, the detector heads 20 rotate about the subject-receiving aperture 18 (and the subject when located therein) along with the rotation of the rotating gantry 16. In operation, the detector heads 20 are rotated or indexed around the subject to monitor radiation from a plurality of directions to obtain a plurality of different angular views.

Each of the detector heads 20 has a radiation-receiving face facing the subject-receiving aperture 18 that includes a scintillation crystal, such as a large doped sodium iodide crystal, that emits a flash of light or photons in response to incident radiation. An array of photomultiplier tubes receives the light and converts it into electrical signals. A resolver circuit resolves the x, y-coordinates of each flash of light and the energy of the incident radiation. That is to say, radiation strikes the scintillation crystal causing the scintillation crystal to scintillate, i.e., emit light photons in response to the radiation. The photons are directed toward the photomultiplier tubes. Relative outputs of the photomultiplier tubes are processed and corrected to generate an output signal indicative of (1) a position coordinate on the detector head at which each radiation event is received, and (2) an energy of each event. The energy is used to differentiate between various types of radiation such as multiple emission radiation sources, stray and secondary emission radiation, transmission radiation, and to eliminate noise. An image representation is defined by the radiation data received at each coordinate. The radiation data is then reconstructed into an image representation of the region of interest.

Optionally, the detector heads 20 include mechanical collimators 24 removably mounted on the radiation receiving faces of the detector heads 20. The collimators 24 preferably include an array or grid of lead or otherwise radiation-absorbent vanes which restrict the detector heads 20 from receiving radiation not traveling along selected rays in accordance with the data type being collected (i.e., parallel beam, fan beam, and/or cone beam).

One or more radiation sources 30 are mounted across the subject-receiving aperture 18 from the detector heads 20. Optionally, they are mounted between the detector heads 20 or to the radiation receiving faces of opposing detector heads 20 such that transmission radiation from the radiation sources 30 is directed toward and received by corresponding detector heads 20 on an opposite side of the subject-receiving aperture 18. In a preferred embodiment, the collimators 24 employed on the detector heads 20, in effect, collimate the transmission radiation. That is to say, the collimators 24 restrict the detector heads 20 from receiving those portions of transmission radiation not traveling along rays normal (for parallel beam configurations) to the radiation receiving faces of the detector heads 20. Alternately, other collimation geometries are employed and/or the collimation may take place at the source.

In a preferred embodiment, the radiation sources 30 are line sources each extending the axial length of the respective detector heads 20 to which they correspond. Preferably, the lines sources are thin steel tubes filled with radionuclides and sealed at their ends. Alternately, the radiation sources 30 are bar sources, point sources, flat rectangular sources, disk sources, flood sources, a tube or vessel filled with radionuclides, or active radiation generators such as x-ray tubes. Alternately, one or more point sources of transmission radiation may be utilized.

With reference again to FIG. 1, the running of an imaging operation includes a reconstruction technique wherein emission data is reconstructed via an image processor 100 into an image representation of the distribution of radioactive material in the patient. Of course, the reconstruction technique changes according to the types of radiation collected and the types of collimators used (i.e. fan, cone, parallel beam, and/or other modes). In any case, emission radiation from the patient is received by the detector heads 20, and emission projection data is generated. The emission data normally contains inaccuracies caused by varying absorption characteristics of the patient's anatomy. Optionally, a transmission scan is also performed such that transmission radiation from one or more of the transmission radiation source 30 is also received by the detector heads 20, and transmission projection data is generated. The transmission data is normally truncated due to the size of the detector heads 20 or by virtue of the type of collimators 24 used. Where a transmission scan is performed, a sorter 200 sorts the emission projection data and transmission projection data on the basis of their relative energies. The data is stored in a projection view memory 110, more specifically, in corresponding emission memory 112 and transmission memory 114.

A data processor 120 takes the emission data from the emission memory 112, and corrects the emission data in accordance with attenuation factors stored in a memory 130. The attenuation factors are determined from a non-uniform attenuation map whose generation is discussed in greater detail later herein. For each ray along which emission data is received, the data processor 120 calculates the projection of a corresponding ray through the transmission attenuation factors stored in the memory 130. Each ray of the emission data is then weighted or corrected in accordance with the attenuation factors and reconstructed by a reconstruction processor 140 to generate a three-dimensional emission image representation that is stored in a volumetric image memory 300. In a preferred embodiment, the reconstruction performed is a filtered backprojection, maximum likelihood-expectation maximization (ML-EM) algorithm, ordered subset-expectation maximization (OS-EM) algorithm, or other appropriate reconstruction. A video processor 310 withdraws and formats selected portions of the data from the image memory 300 to generate corresponding human-readable displays on a video monitor 320 or other rendering device. Typical displays include reprojections, selected slices or planes, surface renderings, and the like.

Figure 2:
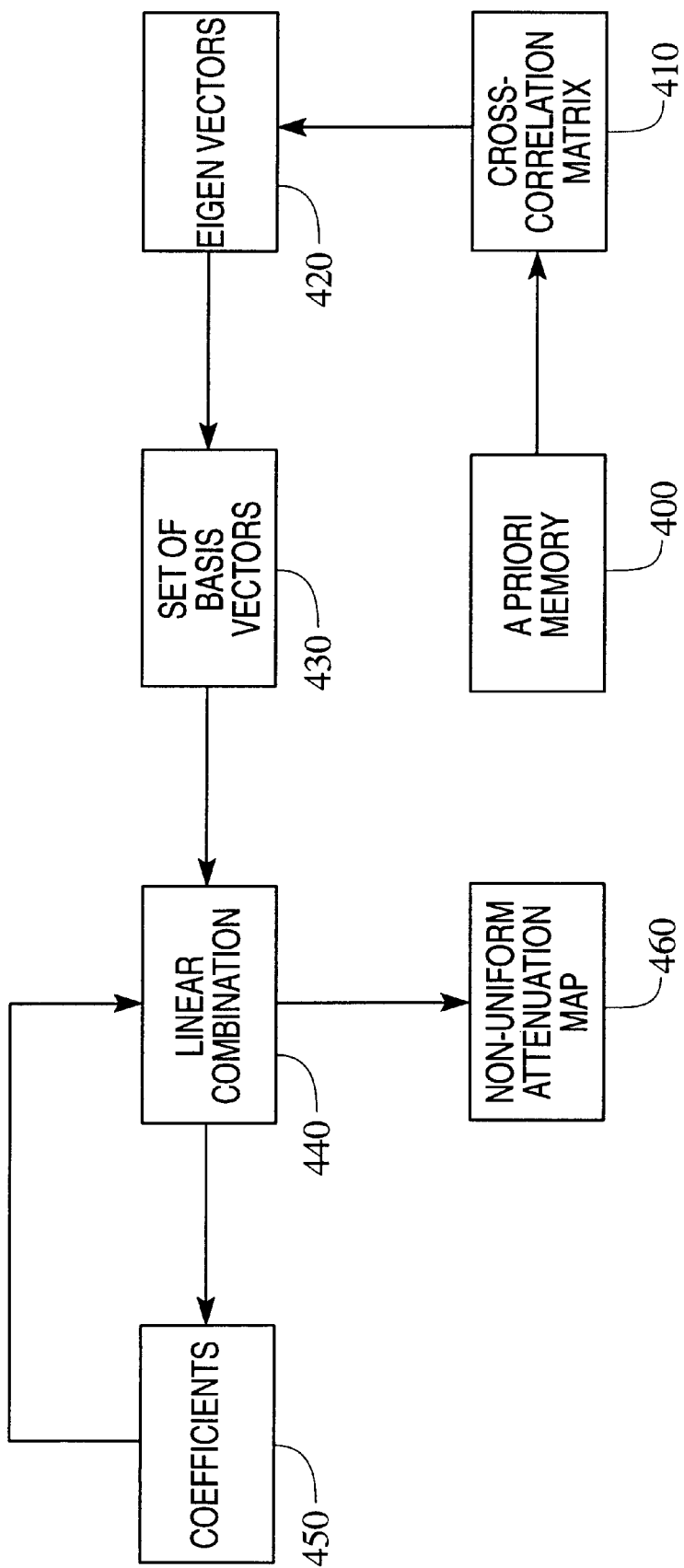

With reference to FIGS. 2 and continuing reference to FIG. 1, the technique is illustrated for generating the non-uniform attenuation map 460 which is ultimately used to correct the emission data from the SPECT scan. The first step is to collect a population of a priori transmission images (i.e., a "knowledge set") which are stored in what is nominally termed an a priori image memory 400. The a priori transmission images are not from the patient currently under examination. Rather, they are cross-sections of similar structure. That is to say, they are transmission images from other subjects of the particular region of interest currently being imaged for the patient. In a preferred embodiment, the a priori transmission images are refined and/or pre-processed to remove truncated edges and other reconstruction artifacts. The a priori transmission images are optionally obtained from CT scans, PET transmission scans, other SPECT transmission scans, and the like. In a preferred embodiment, the population includes on the order of 1000 a priori transmission images.

The next step is to generate a cross-correlation matrix 410 from the knowledge set. With the knowledge set having n members being denoted by $\{X_i\}$, and where the index, i, denotes an order number of the a priori transmission image, X; the cross-correlation matrix, R, is constructed according to the following definition:

$$R = \sum_{i}^{n} X_i \cdot X_i^T. \tag{1}$$

The next step is to calculate the eigenvectors 420 of the cross-correlation matrix 410. In a preferred embodiment, a Karhunen-Loève transform or expansion is employed to derive the eigenvectors 420 of the cross-correlation matrix 410. The Karhunen-Loeve transform is a unitary transform that performs a complete decorrelation between transform coefficients.

A set of orthonormal basis vectors 430 is generated from the eigenvectors 420. The set of orthonormal basis vectors 430 is constructed from a predetermined number of selected eigenvectors chosen from the eigenvectors 420 of the cross-correlation matrix 410. The selected eigenvectors have corresponding eigenvalues that are larger than the eigenvalues of non-selected eigenvectors. That is to say, those eigenvectors 420 having the largest eigenvalues are chosen. In a preferred embodiment, the eigenvectors 420 are ordered according to their eigenvalues, and a predetermined number are taken off the top high-eigenvalue end. In a preferred embodiment, 15% or less of the eigenvectors 420 are chosen. Optionally, the processing of this step is selectively tunable to allow any of a range of predetermined number of eigenvectors to be selected.

Next, a linear combination of the basis vectors is constructed 440, and coefficients for the basis vectors are determined 450 such that the linear combination thereof defines the non-uniform attenuation map 460.

Mathematically, the procedure is to find a set of optimal orthonormal basis vectors $\{v_j, j=1, \ldots, N\}$, for $\{X_j\}$ where each $X_i$ has a dimension N. An approximation using m basis vectors is given by:

$$X_i = \sum_{j=1}^{m} b_{ij} \cdot v_j + r_{im}; \quad i = 1, 2, \ldots, n, \tag{2}$$

where $r_{im}$ is the residual error, and $b_j$ are the coefficients of the basis vectors. In order to find the optimal basis vectors $\{v_j\}$, the residual norms are minimized, that is:

$$\sum_{i=1}^{n} \|r_{im}\|^2 = \sum_{j=m+1}^{n} v_j^T \left( \sum_{i=1}^{n} X_i X_i^T \right) v_j = \sum_{j=m+1}^{n} v_j^T R v_j \tag{3}$$

is minimized. Next, the quadratic form from equation (3) is minimized with the constraint $v_j^T v_j = 1$. The extremums of this quadratic form correspond to the eigenvectors of the matrix R. This procedure finds the optimal basis set in the sense that the average of the differences between members of a given set of a priori images, and their truncated linear expansion for any basis set, is minimal for this particular set. This procedure is the foundation for deriving the Karhunen-Loève transform. Its basis vectors are often referred to as principal components. Additionally, one of the properties of the Karhunen-Loève transform is that the eigenvalue $\lambda_j$, normalized by the number of images from a knowledge set, represents the average value of $b_j^2$ for the whole knowledge set, that is:

$$\sum_{i=1}^{n} b_{ij}^2 = v_j^T \left( \sum_{i=1}^{n} X_i X_i^T \right) v_j = v_j^T R v_j = \lambda_j, \tag{4}$$

which implies that:

$$\frac{1}{\lambda_j} \sum_{i=1}^{n} b_{ij}^2 = 1; \quad \text{for all } j. \tag{5}$$

Equations (4) and (5) are valid only for images from the knowledge set, and the distribution property from equation (4) for the magnitudes of the expansion coefficients is expected for each image of similar structure. The eigenvalues $\lambda_j$ represent variance of the principal components.

In a preferred embodiment, where a transmission scan has been performed and/or truncated transmission projections from the patient currently being imaged are otherwise available from the transmission memory 114, the coefficients for the basis vectors are determined by iteratively comparing projections of the set of orthonormal basis vectors having estimated coefficients with truncated transmission projections from the subject. Using a least-squares fit, the coefficients are select which best match the projections of the set of orthonormal basis vectors to the truncated transmission projections from the patient.

More specifically, where I is a test image which is approximately represented as a truncated linear expansion of a set basis vectors corresponding to those eigenvectors having the largest eigenvalues, the following equation is obtained:

$$I = \sum_{j=1}^{N} \beta_j v_j \approx \sum_{j=1}^{m} \beta_j v_j. \tag{6}$$

The linear relationship is retained in projection space, such that where P is the linear projection operator, then:

$$P(I) \approx \sum_{j=1}^{m} \beta_j \cdot P(v_j) \tag{7}$$

is the expansion in projection space. In practice, P(I) (i.e., the truncated transmission data) has been acquired and the projections of the basis vectors $\{P(v_j)\}$ are generated. Because the generated projections of the basis vectors are no longer orthogonal, a linear least squares method is used to find the coefficients $\beta_j$ of the linear expansion. Because relation (7) is not accurate and residual errors exist, the solution $\{\beta_j\}$ is unstable. Note that the solution from relation (7) may not be the same solution from relation (6) due to the non-orthogonality of basis projections. To stabilize the solution, a constrained linear inversion method is applied.

Equation (4) indicates that if the text image is similar to those images in the knowledge set, $\beta_j^2/\lambda_j$ is approximately a constant for all j. This is seen by interpreting the summation in equation (5) as the statistical average over the knowledge set. The normalized energy of an expansion is defined as $\Sigma \beta_j^2/\lambda_j$, which is rewritten as $\beta^T \Lambda \beta$, where $\Lambda$ is a diagonal matrix of inverse eigenvalues. Thus, this normalized energy is used to regularize the least-squares problem. This minimal energy constraint encourages large $\beta_j^2$ for a large eigenvalue $\lambda_j$, and small $\beta_j^2$ for a small eigenvalue $\lambda_j$.

Looking at equation (4) from a different point of view, the first eigenvector, corresponding to the largest eigenvalue of the cross-correlation matrix 410 of the knowledge set, is considered as the average image over all images in the knowledge set. The average of the expansion coefficients, excluding the first coefficient, for the knowledge set is zero. The corresponding eigenvalues are the standard deviations of distribution of expansion coefficients. For a solution to the inverse problem, the expansion coefficient magnitude is made to be not much larger than the corresponding standard deviation and the regularized solution is biased towards the a priori estimate of the average image.

The coefficients of the expansion in relation (6) are obtained by solving the following minimization problem:

$$\min\{\|P(I) - A\beta\|^2 + \gamma \cdot \beta^T \Lambda \beta\} \tag{8},$$

where columns of the matrix A are $P(v_j)$ and $\gamma$ is the constrain parameter. The constrained linear inversion solution is then given by:

$$\beta = (A^T A + \gamma \Lambda)^{-1} A^T P(I) \tag{9},$$

where a QR decomposition method is used to find the solution to equation (9).

In another preferred embodiment, where no transmission projections of the patient currently being imaged are collected or otherwise made available from the transmission memory 114, the coefficients for the basis vectors are determined by iteratively employing Natterer's data consistency conditions to relate emission data from the subject to transmission projections. The transmission projections are generated from projections of the set of orthonormal basis vectors having estimated coefficients. Using a linear least-squares fit, the coefficients are selected which generate the transmission projections that best fulfill Natterer's data consistency conditions. Natterer's data consistency condition for SPECT is mathematically represented by the following equation:

$$\int_0^{2\pi} \int_{-\infty}^{\infty} s^m e^{ik\Phi} e^{\frac{1}{2}[T(\Phi,s)+iHT(\Phi,s)]} E(\Phi, s) ds\, d\Phi = 0; \text{ for } 0 \le m < k; \quad (10)$$

where E represents the emission data, T represents transmission line-integrals, and H is the Hilbert transform with respect to s. In equation (10), $T(\phi,s)$ is not available due to the lack of measured transmission data, and it is therefore modeled as follows:

$$T(\Phi, s) = P\left(\sum_{j=1}^{m} \beta_j v_j(x,y)\right) = \sum_{j=1}^{m} \beta_j P(v_j(x,y)) = \sum_{j=1}^{m} \beta_j T_j(\Phi, s); \quad (11)$$

where $v_j(x,y)$ represent the set of orthonormal basis vectors 430, m is the predetermined number of eigenvectors selected to generate the set of basis vectors, P is the projection operator, and $\beta_j$ are the expansion coefficients to be estimated and/or determined.

In a preferred embodiment, separate dedicated data processors and/or circuits, application specific and/or otherwise, are employed to carried out the various steps for generating the non-uniform attenuation map 460. As well, the steps are alternately implemented by hardware, software, and/or combinations of hardware and software configurations. Optionally, one or more or all the steps are combined for processing by one integrated data processor or computer.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A method of reconstructing a diagnostic image representation from emission data collected from a patient, the method comprising:

(a) collecting a set of transmission image representations including transmission image representations from a plurality of different subjects, each image representation being of like anatomy, said set of transmission image representations not including one of the patients;

(b) generating a cross-correlation matrix from the set of transmission image representations;

(c) calculating eigenvectors of the cross-correlation matrix;

(d) generating a set of orthonormal basis vectors from the eigenvectors;

(e) constructing a linear combination of the basis vectors;

(f) estimating transmission projection data by generating projection data from the set of orthonormal basis vectors having estimated coefficients;

(g) generating an attenuation map from the estimated transmission projection data;

(h) formulating data consistency conditions defining a relationship between measured emission data collected from the patient and the estimated transmission projection data;

(i) determining coefficients for the basis vectors which generate transmission projections that best fulfill the data consistency conditions using a linear least-squares fit; and (j) reconstructing an emission image representation from the emission data and the determined coefficients.

2. The method according to claim 1, wherein the data consistency conditions are Natterer's data consistency conditions.

3. An image processor for reconstructing images of a distribution of radioactive material in a patient being examined with a gamma camera comprising:

an emission memory which stores emission data collected by the gamma camera;

an attenuation factor memory which stores attenuation factors calculated from a non-uniform attenuation map;

a data processor which takes the emission data and corrects it for attenuation in accordance with the attenuation factors stored in the attenuation factor memory;

a reconstruction processor that takes corrected emission data from the data processor and therefrom reconstructs an image representation of the distribution of radioactive material in the patient;

an a priori image memory that stores a priori transmission data from a plurality of a priori transmission scans of a region of interest that is the same as that being reconstructed, said transmission scans originating from subjects other than the patient;

a cross-correlation data processor that constructs a cross-correlation matrix from the a priori transmission scans;

an eigenvector data processor that calculates eigenvectors of the cross-correlation matrix;

a basis data processor that constructs a set of orthonormal basis vectors from the eigenvectors of the cross-correlation matrix; and, an iterative data processor that computes coefficients for the basis vectors such that a linear combination thereof defines the non-uniform attenuation map.

4. The image processor according to claim 3, wherein the eigenvector data processor employs a Karhunen-Loève transform to calculate the eigenvector of the cross-correlation matrix.

5. The image processor according to claim 3, wherein the basis data processor constructs the set of orthonormal basis vectors by selecting a predetermined number of the eigenvectors, wherein the eigenvectors selected have corresponding eigenvalues greater than any eigenvalue of those eigenvectors not selected.

6. The image processor according to claim 5, wherein the basis data processor is tunable by altering the predetermined number of the eigenvectors selected.

7. The image processor according to claim 5, wherein the predetermined number of said selected eigenvectors selected by the basis data processor is less than or equal to approximately 15% of the eigenvectors of the cross-correlation matrix calculated by the eigenvalue data processor.

8. The image processor according to claim 3, wherein the iterative data processor:

estimates transmission projection data by generating projection data from the set of orthonormal basis vectors having estimated coefficients;

formulates data consistency conditions, the data consistency conditions defining a relationship between measured emission data from the subject and the estimated transmission projection data; and identifies coefficients for the basis vectors which generate transmission projection data that best fulfill the data consistency conditions.

9. The image processor according to claim 8, wherein the data consistency conditions are Natterer's data consistency conditions.

10. The image processor according to claim 3, wherein no transmission data from the gamma camera is used in reconstructing images of the distribution of radioactive material in the patient.

11. An image processor for reconstructing images of a distribution of radioactive material in a first patient being examined with a gamma camera, comprising:

an a priori image memory that stores a priori transmission data from a plurality of a priori transmission scans of a region of interest that corresponds to a region to be reconstructed, said a priori transmission data originating from subjects other than the first patient;

a cross-correlation data processor that constructs a cross-correlation matrix from the a priori transmission data;

a vector processor that constructs a set of orthonormal basis vectors from the cross-correlation matrix;

a transmission memory which stores truncated transmission projections of the first patient collected by the gamma camera;

an iterative data processor which (i) iteratively compares projections of linear combination of basis vectors with estimated coefficients to the truncated transmission projections, and (ii) selects coefficients which best match the projections of the linear combination of basis vectors to the truncated transmission projections;

an attenuation factor memory which stores the selected coefficients;

an emission memory which stores emission data collected by the gamma camera;

a correction processor which corrects emission data for attenuation in accordance with the selected coefficients stored in the attenuation factor memory;

a reconstruction processor that reconstructs the corrected emission data into an image representation of the distribution of radioactive material in the first patient.

12. A method of reconstructing a diagnostic image representation from measured emission radiation from a subject to be imaged, comprising:

collecting projection data including measured emission projection data from the subject;

collecting a knowledge set comprising a plurality of transmission image representations, the plurality of transmission image representations generated from a corresponding section of similar structure of a plurality of subjects other than the subject to be imaged;

using the knowledge set to generate an attenuation map which provides an estimate of radiation attenuation properties of the subject to be imaged; and reconstructing an emission image representation from the emission projection data and the attenuation map.

13. A method according to claim 12, wherein the attenuation map is generated by:

(a) generating a cross-correlation matrix from the knowledge set of transmission images;

(b) calculating eigenvectors of the cross-correlation matrix;

(c) generating a set of orthonormal basis vectors from the eigenvectors;

(d) constructing a linear combination of the basis vectors; and, (e) determining coefficients for the basis vectors such that the linear combination thereof defines the non-uniform attenuation map.

14. The method according to claim 13, wherein a Karhunen-Loève transform is employed to calculate the eigenvectors of the cross-correlation matrix.

15. The method according to claim 13, wherein the set of orthonormal basis vectors is constructed from a predetermined number of selected eigenvectors chosen from the eigenvectors of the cross-correlation matrix, said selected eigenvectors having corresponding eigenvalues larger than eigenvalues of non-selected eigenvectors of the cross-correlation matrix.

16. The method according to claim 15, wherein the predetermined number of said selected eigenvectors is less than or equal to approximately 15% of the calculated eigenvectors of the cross-correlation matrix.

17. The method according to claim 13, wherein the step of determining coefficients for the basis vectors comprises:

iteratively comparing projections of the set of orthonormal basis vectors having estimated coefficients with truncated transmission projections from the subject; and, using a least-squares fit to select coefficients which best match the projections of the set of orthonormal basis vectors to the truncated transmission projections from the subject.

18. The method according to claim 13, wherein no transmission scan of the subject is performed.

19. The method according to claim 12, wherein the attenuation map is generated using an eigenvector analysis.

20. The method according to claim 12, wherein the knowledge set is correlated with the measured emission projection data.

21. The method according to claim 12, wherein the measured projection data further includes measured transmission projection data, and further wherein the knowledge set is correlated with the measured transmission projection data.

22. The method according to claim 21, wherein the measured transmission projection data is truncated.

23. The method according to claim 12, wherein and at least one transmission image representation is of an imaging modality different from the emission image representation.

24. A method of constructing a non-uniform attenuation map for use in reconstructing a diagnostic image representation from measured emission radiation projection data of a first imaged subject, comprising:

collecting a knowledge set comprising a plurality of transmission image representations, the plurality of transmission image representations generated from a corresponding section of similar structure of one or more subjects other than the first imaged subject; and generating an attenuation map which provides an estimate of radiation attenuation properties of the first imaged subject using the knowledge set.

* * * * *